(12) United States Patent
Chilimbi et al.

(10) Patent No.: US 8,079,020 B2
(45) Date of Patent: Dec. 13, 2011

(54) PREFERENTIAL PATH PROFILING

(75) Inventors: Trishul Amit Madhukar Chilimbi, Seattle, WA (US); Kapil Vaswani, Karnataka (IN); Aditya Vithal Nori, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 1317 days.

(21) Appl. No.: 11/682,196

(22) Filed: Mar. 5, 2007

(65) Prior Publication Data

US 2008/0222614 A1   Sep. 11, 2008

(51) Int. Cl.
*G06F 9/44* (2006.01)

(52) U.S. Cl. ........ 717/132; 717/124; 717/130; 717/131; 717/133

(58) Field of Classification Search .................. None
See application file for complete search history.

(56) References Cited

U.S. PATENT DOCUMENTS

| | | | | |
|---|---|---|---|---|
| 5,828,883 | A * | 10/1998 | Hall | 717/133 |
| 5,999,736 | A * | 12/1999 | Gupta et al. | 717/158 |
| 6,848,100 | B1 * | 1/2005 | Wu et al. | 717/157 |
| 7,827,536 | B2 * | 11/2010 | Armstrong et al. | 717/127 |
| 7,926,043 | B2 * | 4/2011 | Vaswani et al. | 717/130 |

OTHER PUBLICATIONS

Thomas Ball, "Efficient Path Profiling", 1996, Proceedings MICRO-29.*
Rahul Joshi, "Targeted Path Profiling: Lower Overhead Path Profiling for Staged Dynamic Optimization Systems", 2004, In CGO.*
Taweesup Apiwattanapong, "Selective Path Profiling", 2002, AMC.*
Glenn Ammons, "Exploiting Hardware Performance Counters with Flow and Context Sensitive Profiling", 1997, AMC.*
Michael Bond, "Practical Profiling For Dynamic Optimizers", 2005, CGO.*
Evelyn Duesterwald, "Software Profiling for Hot Path Prediction: Less is More". 2000, ASPLOS.*

* cited by examiner

*Primary Examiner* — Lewis Bullock, Jr.
*Assistant Examiner* — Mark Gooray
(74) *Attorney, Agent, or Firm* — Workman Nydegger

(57) ABSTRACT

This paper describes preferential path profiling, which enables profiling a specified subset of all possible program paths with very low overhead. Preferential path profiling compactly identifies paths of interest using an array. More specifically, PPP assigns a unique and compact path index identifier to all interesting paths that can be used to index into a path array. The path array contains a second path value identifier that is used to distinguish interesting paths from other program paths This path numbering allows the implementation of preferential path profiling to use array-based counters instead of hash table-based counters for identifying paths of interest and gathering path profiles, which significantly reduces execution time and computational resource overhead during profiling.

14 Claims, 5 Drawing Sheets

Array using the index identifier as the index into the array

Ball - Larus

PPP

PPP & Ball - Larus

PREFERENTIAL PATH PROFILING

CROSS-REFERENCE TO RELATED APPLICATIONS

N/A

BACKGROUND

When software is compiled, it is converted from a high level "human readable" set of statements to a set of low level "machine readable" or binary instructions. The binary instructions can then be executed in a runtime environment to perform a particular function defined by the human readable set of statements. During execution, however, problems in efficiency, performance, and/or other coding errors may occur. Accordingly, analyzing a computer program's behavior during such runtime environment provides many benefits to both developers and end users by collecting information relevant to problems and/or to optimization. For instance, analysis has proved valuable in a wide variety of areas such as computer architecture, compilers, debugging, program testing, and software maintenance.

In order to monitor the behavior of such runtime execution, profilers have been developed, which provide tools that measure the behavior of a program as it runs, particularly the frequency and duration of function calls. The output is a stream of recorded events (a trace) or summaries of the events observed (a profile). The performance or other data gathered can then be used to determine such things as which source code might benefit most from improved or optimized coding. For example, if a particular function is called within a program loop and the loop is a "hot spot" during execution, it may be desirable to program the function in-line within the loop—rather than as a function call.

Typical profiling operations collect information such as: block profiles, which represent the frequency of execution of blocks of code; edge profiles, which represent the frequency of taken branches in and out of blocks of code; path profiles, which represent sequences of taken edges; and complete profiles, which record all instructions executed within the compiled code. Path profiles provide many advantages over basic block, edge, and even complete trace profilers. For example, path profiles capture much more control-flow information than basic block or edge profiles; yet they are much smaller than complete instruction traces. Further, several compiler optimizations perform better when trade-offs are driven by information gained from accurate path profiles. Program paths are also a more credible way of measuring coverage of a given test suite. In addition, abstractions of paths can help automatic test generation tools create more robust test cases; and program path histories often serve as a valuable debugging aid by revealing an instruction sequence which may have executed in the lead up to interesting program points.

Unfortunately, the benefits of using path profiles come at a significant cost—i.e., path profiling is expensive in measures of time and/or computational resources. For example, the number of potential paths within a program or a procedure can be, and often is, arbitrarily large. In order to deal with such arbitrary size problem, path profilers use hash tables to identify paths, analyze paths, and store path profile information. Although hash tables provide a convenient and effective mechanism for storing and accessing the path profile information, the overhead for using hashes is still high—as much as 50% of an average execution time. Accordingly, despite the known benefits of performing path profiling, the high overhead of analyzing path profiles has limited the use of path profiles in favor of basic block or edge profiles.

As mentioned above, however, while basic block and edge profiles are less expensive to collect, they do not accurately capture a program's dynamic behavior as compared to path profiles. In many cases, the most complex and most interesting paths are not predictable from information and analysis of a block or edge profile.

BRIEF SUMMARY

The above-identified deficiencies and drawbacks of current computer path profiling techniques are overcome through example embodiments of the present invention. For example, embodiments described herein provide mechanisms for reducing the overhead associated with typical path profiling by constructing and using an array of values that represents a subset of an overall number of paths within a control-flow graph. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one example embodiment for reducing the overhead associated with typical hashing of path values in path profiling, a subset of paths from a number of control-flow paths is identified based upon predefined criteria to limit path selection. A path index identifier is then determined for each path within the subset of paths. Note that each index identifier will be associated with an index into an array representing the subset of paths. In addition, a path value is assigned for each of the subset of paths which is to be used for distinguishing a path within the subset of paths from at least some of the paths which are not in the subset. Path index identifiers for paths within the subset of paths can then be correlated within an array with the assigned path values. During path profiling, the appropriate path index identifier and correlated path value can then be used to determine if a particular path traversed corresponds to a path within the subset of paths.

Another example embodiment provides for using the above created array in a runtime computer profiling environment. In this embodiment, a path index identifier is determined for a path traversed during execution of a computer program. Note that the path index identifier will be used to access an array representing a subset of paths from a control-flow graph representing an abstraction of the program's dynamic control-flow behavior. Also note that the subset of paths was chosen based on some predefined criteria to limit path selection. Further, a first path value is determined, where the path value represents an identifier used in distinguishing the subset of paths from at least some of the paths which are not within the subset. Based on the determined path index identifier, the array is then accessed to retrieve a previously assigned path value. Thereafter, the previously assigned path value is compared to the determined first path value in order to determine if the path is within the subset of paths.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
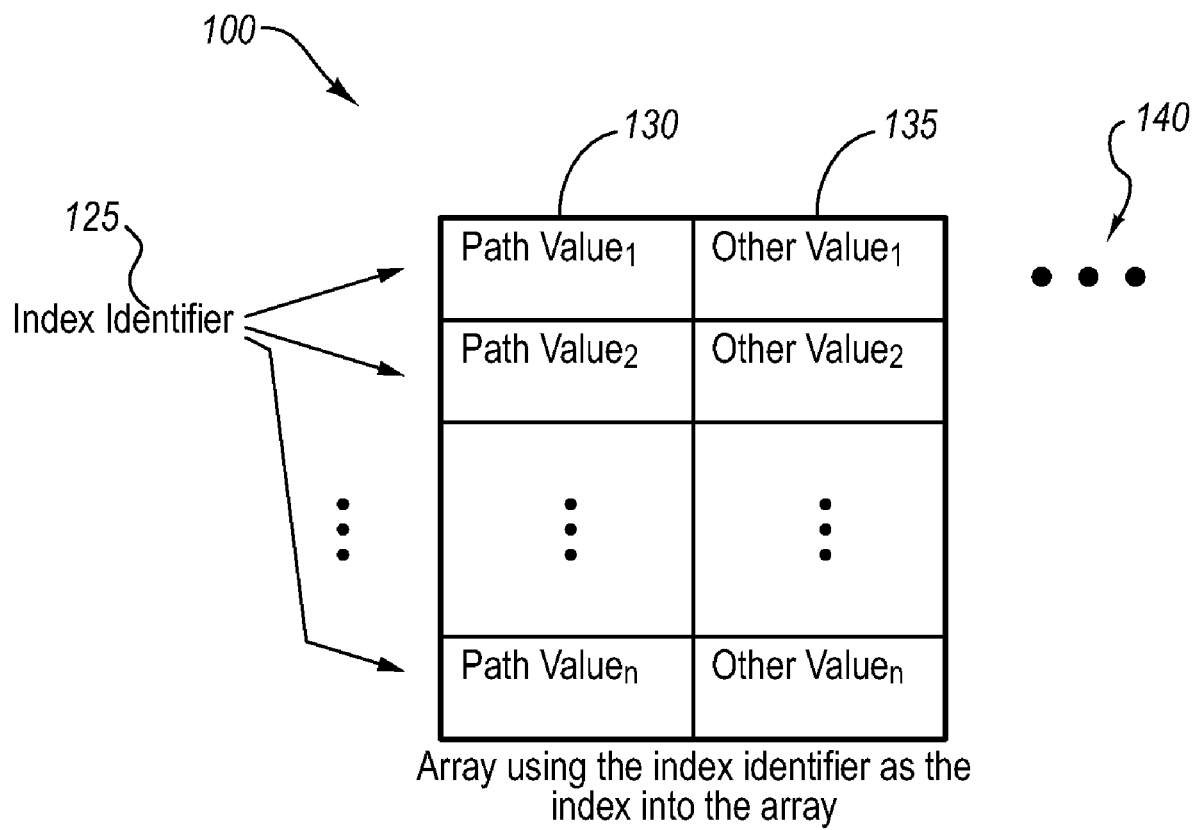
FIG. 1 illustrates an example array generated in accordance with preferential path profiling described herein.

The present invention extends to methods, systems, and computer program products for reducing the overhead associated with hashes and other problems of typical path profiling systems. The embodiments of the present invention may comprise a special purpose or general-purpose computer including various computer hardware or modules, as discussed in greater detail below.

As noted above, there are several problems associated with typical path profiling for computer programs. For example, the hash tables used for storing and looking up information about a path profile are expensive in terms of time and/or computational resources. As such, embodiments identify some subset or preferential paths, which can then be indexed in an array. For example, the subset may be chosen based on "hot paths" or some other criteria for limiting path selection. Each preferential path identified is then associated with an index into the array.

A second identifier or path value is then assigned to each path within the subset, and appropriately indexed or stored in the array. This second identifier may be a global unique identifier such as a Ball-Larus identifier, or similar type of value. During a runtime execution of the program, the profiler can distinguish between paths within the subset and paths outside the subset by: calculating the index value; looking up the second identifier within the array based on the calculated index; and comparing the stored identifier with the actual unique or global identifier for that path. If the values match, the path is known to be part of the subset. Otherwise, if the index value calculated is beyond the bounds of the array, or if the values do not match, then the path is outside the subset. Based on such determination, information about the path may or may not be recorded or otherwise used. Because such embodiments allow for paths to be profiled using an array instead of the typical hash table, benefits are realized in time and/or computational resources.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

As noted above, the present invention exploits efficiencies which are available when profiling a subset of paths within a number of paths in a control-flow graph (CFG) representing an abstraction of a program's dynamic behavior. As was noted above, in a typical path profiling environment, because the number of paths within a program's CFG may be arbitrarily large, a hash table must be used to store path profile information. The time and resources necessary for hash function calculation and hash table storage and retrieval can be expensive. By identifying a subset of paths (i.e., "interesting" paths), an array may be used for identification of paths within the subset and may also be used for storage of other values representing path profiling information.

FIG. 1 illustrates an array 100 which may be used in example embodiments of preferential path profiling. As can be appreciated, the array may be implemented in any number of well known various ways. As will be described in greater detail below, a path or index identifier 125 may be determined for a traversed path within a control-flow graph of a program or procedure. The path for which the path index identifier is determined may be from a subset of paths for a number of control-flow paths which represent an abstraction of a program's dynamic behavior. The index identifier may then be used as an index into the array 100 as shown in FIG. 1.

The paths within the subset of paths may be chosen by a number of predefined criteria to limit path selection. For example, the paths within the subset of paths may be chosen based on a development engineer's desire to study particular paths. Alternatively, or in conjunction, the paths within the subset of paths may be chosen based upon a test engineer's desire to acquire information for particular paths within a program's control-flow. Moreover, the paths within the subset of paths may be chosen based upon prior testing which revealed frequent execution of the path or prior testing which revealed problematic (i.e., "buggy") behavior during execution of the paths. In addition, the paths within the subset may be chosen based upon a program user's desire to optimize operational behavior of certain execution regimes of the program. As can be appreciated, the subset of paths may be chosen based upon nearly any predefined criteria or even arbitrary criteria (e.g., the lesser amount of paths between two path sets, randomly chosen, etc.), which can limit the selection of paths. Accordingly, any particular use of criteria to limit the path selection to some preferred subset is used herein for illustrative purposes only and is not meant to limit or otherwise narrow the scope of embodiments described herein unless otherwise explicitly claimed.

FIG. 1 also illustrates a path value 130 which can be assigned for a particular path and correlated with a determined path index identifier 125 for the particular path. A path index identifier 125 may be calculated so that the index identifier uniquely identifies a particular path within the subset of paths, but (as described in greater detail below) the index identifier may not necessarily distinguish a particular path from paths not within the subset. In addition, a path value 130 for the path may be assigned such that the path value may be used to distinguish a path within the subset from paths which are not within the subset of paths.

In an alternative embodiment, a field 135 or set of fields within the array 100 may be allocated for storage of other path profiling information. For example, such other information may be the frequency of traversal for a particular path during a path profiling session. Alternatively, or in addition to, the other value 135 or set of values may be information representing the duration of time spent during execution of a particular path. Moreover, the other value 135 or set of values may be representative of the frequency of associated aberrant behavior (i.e., "bugs"), which may occur during execution of a particular path. In fact, as can be appreciated, the other value 135 or set of values may be any information desired for recording during a path profiling session. Moreover, as one would recognize, the number of fields allocated (i.e., the number of fields for other values 135) may be any number of fields as indicated in FIG. 1 by ellipses 140.

As noted above, FIG. 1 illustrates a simple version of a preferential path profile array in accordance with one example embodiment. In the array 100 in FIG. 1, the determined path index identifier 125 (as will be described below), itself, may be used as the index into the array. In this case, the array contains within an element associated with a particular path index identifier (e.g., index identifier "1") an associated or correlated path value 130. The array 100 may also optionally contain a field for a value 135 or set of fields which, as above, may be used for the recording of path profiling information deemed desirable to collect.

In an alternative embodiment the index of the array 100 is not necessarily the same as the index identifier 125. For example, the index into the array may correspond to the first element; however, the index identifier as described and calculated below does not equal the first index value. More specifically, as would be recognized, the index into the array need not necessarily be exactly the path index identifier, but may also be calculated by some relatively simple function based upon the index identifier. An example of such a function might be a simple offset (e.g., array index=index identifier+ 1). Nevertheless, the index identifiers and path values 130 are correlated or associated such that each path index identifier and correlated path value 130 are associated within the same element of the array 100. It should be noted as described in greater detail below, however, that each element of the array need not contain a determined path index identifier. Accordingly, in certain embodiments of the invention and within certain profiling environments, there may be array elements which do not contain a path index identifier (referred to herein as "holes").

Of course, as will be appreciated, an array as constructed in accordance with example embodiments may have other features or be constructed in other manners besides those illustrated in FIG. 1 or as described above. As such, any particular type of construction or use of an array described herein is for illustrative purposes only as is not meant to limit or otherwise narrow the scope of embodiments herein unless explicitly claimed. Nevertheless, the array should be constructed or designed in a manner which preserves the correlation of the index identifiers with the assigned path values.

As can be appreciated, typical path profiles use summation of edge weights within a control-flow graph (CFG) for uniquely identifying path values. In each of the graphs 205, 210, and 215, in FIG. 2A-C nodes are labeled s, a, b, c, d, and t. Further, in each of these graphs, "s" represents "start" and "t" represents "termination" of a path. Each node represents a block of code, and each edge (e.g., sa, ac, etc.) represents a transition between such blocks. Weights are then assigned to each edge for summation in determining path values for a given set of edges from node s to node t, in accordance with well known path value assignment functions.

Figure 2A:
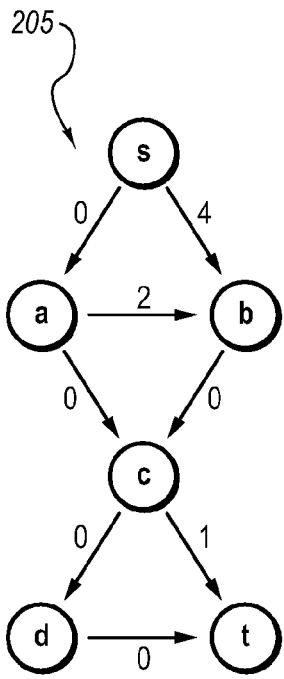
FIG. 2A illustrates an example control-flow graph typical of graphs associated with standard path profiling designs.

For example, FIG. 2A represents a CFG 205 created in accordance with currently known functions for uniquely identifying all paths of the CFG 205. More specifically, edge weight are assigned to each edge (e.g., edge sa=0, ab=2, etc.) such that summation of edge weights along a path (e.g., the summation of edge weights for the path sact=1—i.e., 0+0+ 0+1) is unique among all paths within the graph—whether within the identified subset of paths or not within the subset. For instance, in the CFG 205, the pathID(sacdt)=0 and the pathID(sbcdt)=4, such that each and every path in CFG 205 in FIG. 2A has a similarly unique path index identifier (when determined by summing the edge weights, accordingly).

As can be appreciated, the numbers for the edges of CFG 205 were assigned using the well-known Ball-Larus function. The Ball-Larus function, presented in a paper by T. Ball and J. R. Larus, assigns weights to edges so that each path index identifier computed by summing edge weights as in the examples, above, will have a unique identifier. Note, however, that other functions for assigning unique identifiers or near unique identifiers may be used to implement embodiments described herein. As such, the present invention should not be limited to assigning path values for a subset of paths using the Ball-Larus function. Nevertheless, such so-called Ball-Larus identifiers and other similar functions have the problems, described above, that they can be arbitrarily large and cannot be reasonably stored within an array of reasonable size.

Figure 2B:
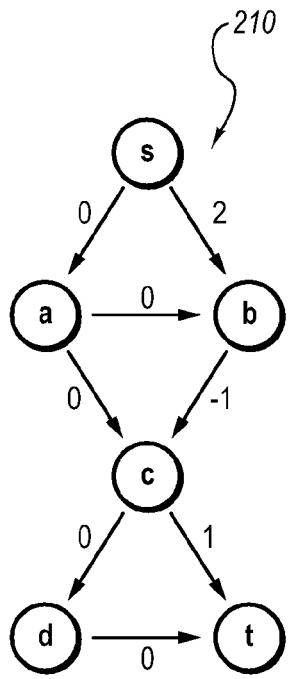
FIG. 2B illustrates an example control-flow graph generated in accordance with the example preferential path profiling embodiment described herein.

Accordingly, embodiments also assign index identifiers, which are unique for each path within a subset, but which need not be unique among paths not within the subset of paths. For instance, FIG. 2B illustrates a program control-flow graph (CFG) 210. By way of example, if one were to consider, out of all the paths within the graph 210, the identified subset of paths to be {sacdt, sact, and sbct}. Also by way of example, consider path index identifiers which may be determined by summing the weights given in the edges noted between the nodes of the CFG 210. In this example, the path index identifier for sacdt (i.e., pathID(sacdt)) would be 0 (i.e., 0+0+0+0). Similarly determined, the pathID(sact)=1 (i.e., 0+0+1), and the pathID(sbct)=2 (i.e., 2+(−1)+1). Accordingly, in this example, the determined path index identifiers for each of the paths within the subset of paths, 0, 1, and 2, which are unique for the subset.

For a path not in the subset, however, the path identifiers may or may not be unique with each other, and in fact may alias each other as well as the path identifiers within the subset. For example, take the path say sbcdt, which has a corresponding pathID(sbcdt)=1 (i.e., 2+(−1)+0+0). As can be appreciated, this determined index identifier equals or aliases the path identifier for path sact within the subset. In addition, while not shown herein, in larger CFGs, the paths not within the subset may collide with path identifiers outside the subset. As such, mechanisms as described below utilize other example embodiments for determining in a runtime environment which paths are within and/or outside the subset. Note that the edge weights which produce unique path identifiers for paths within the subset (i.e., those assignments shown as described in FIG. 2B) may be termed (for convenience but not by way of any limitation) preferential path profiling (PPP) weights. Similarly, the resulting path index identifiers calculated or assigned may be termed (also for convenience but not by way of any limitation) preferential path profiling (PPP) path IDs.

Figure 2C:
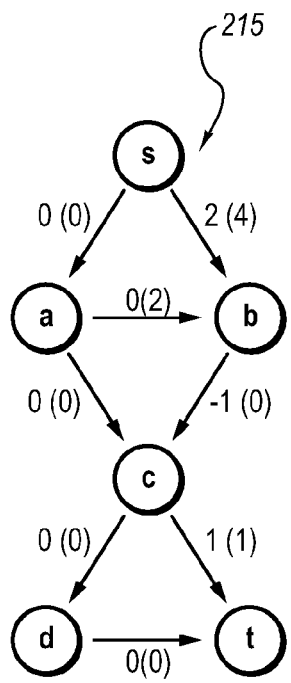
FIG. 2C illustrates an example correlation of the control-flow paths described in relation to FIGS. 2A and 2B.

By using an edge weight assignment as illustrated by CFG 210, which is determined by identifying a subset of paths from all the paths within a program CFG, then a smaller and more manageable number of path index identifiers may be stored in an array as described, above. In order to distinguish paths that are in the identified subset of paths from paths not within the subset, another path value (e.g., the Ball-Larus identifier) may be assigned to the path and stored within an array correlated with the path's index identifier. For example, CFG 215 in FIG. 2C illustrates an example CFG where the edge weight for the subset of paths is indicated and the edge weight as would be assigned by the Ball-Larus function are also assigned as shown in parenthesis. By assigning both the path index and unique path value as described above, an array can then be constructed and used in identifying paths within and outside the subset.

For example, using the edge weights as illustrated in CFG 215 in FIG. 2C, an array may be constructed for the identified subset of paths {sacdt, sact, and sbct}. In this array, the path index identifiers are determined by summing the edge weights and the path value for each path is assigned by summing the (Ball-Larus) weights shown in parenthesis. For the subset of paths {sacdt, sact, and sbct}, the array generated as above may look like:

| path | array element | path index identifier | path value |
|------|---------------|----------------------|------------|
| sacdt | 1 | 0 | 0 |
| sact | 2 | 1 | 1 |
| sbct | 3 | 2 | 4 |

Figure 2D:
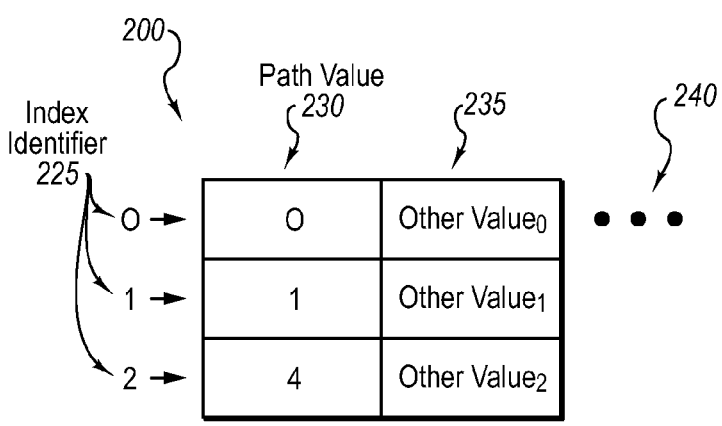
FIG. 2D illustrates an array constructed in accordance with embodiments of the present invention described herein.

Such an array 200 is illustrated in FIG. 2D. The path index identifier 225 is used as the index into the array 200, the path value 230 is stored within the appropriately associated element of the array, and a field 235 (or set of fields 240) is allocated for the storage of path profiling information. Now it can be seen that a path with a path index identifier which aliases to a path within the subset of paths (like sbcdt) may be distinguished from a path within the subset of paths using the path value. For example, as noted above, the path index identifier for sbcdt, pathID(sbcdt)=1, aliases to the path within the subset, sact (whose path index identifier is also 1). The path value assigned, however, for sbcdt in this case would be 4 (by summing the weights in parenthesis in CFG 215). By comparing the path value determined for sbcdt (i.e., 4) with the path value correlated within the array with the path index identifier (i.e., 1) it may then be determined that sbcdt is not a path within the subset of paths. By correlating the index identifiers with path values for paths within the subset, paths can now be differentiated from those within and outside the subset. In addition, the use of the array for identifying preferential paths rather than a hash table allows for more efficient path profiling.

The following describes one example embodiment for assigning such index identifiers, which will typically be referred to as Preferential Path Profiling or PPP. As will be appreciated, however, there may be several functions used for assigning the path index identifiers. As such, the following description used for assigning path index identifiers is used for illustrative purposes only and is not meant to limit or otherwise narrow the scope of the present invention unless otherwise explicitly claimed.

The Preferential Path Profiling (PPP) function is an example embodiment for determining path index identifiers. Such function computes and assigns edge weights for edges within a control-flow graph (CFG) given a predetermined identified subset of paths (e.g., "interesting" paths). The weight of edges, as assigned by the PPP function, may then be used when performing path profiling of a particular program or procedure to determine a particular path's index identifier. More specifically, the PPP function produces a set of edge weights, which when summed along a path within a CFG may be used to uniquely identify paths within a predetermined subset of paths.

Figure 5:
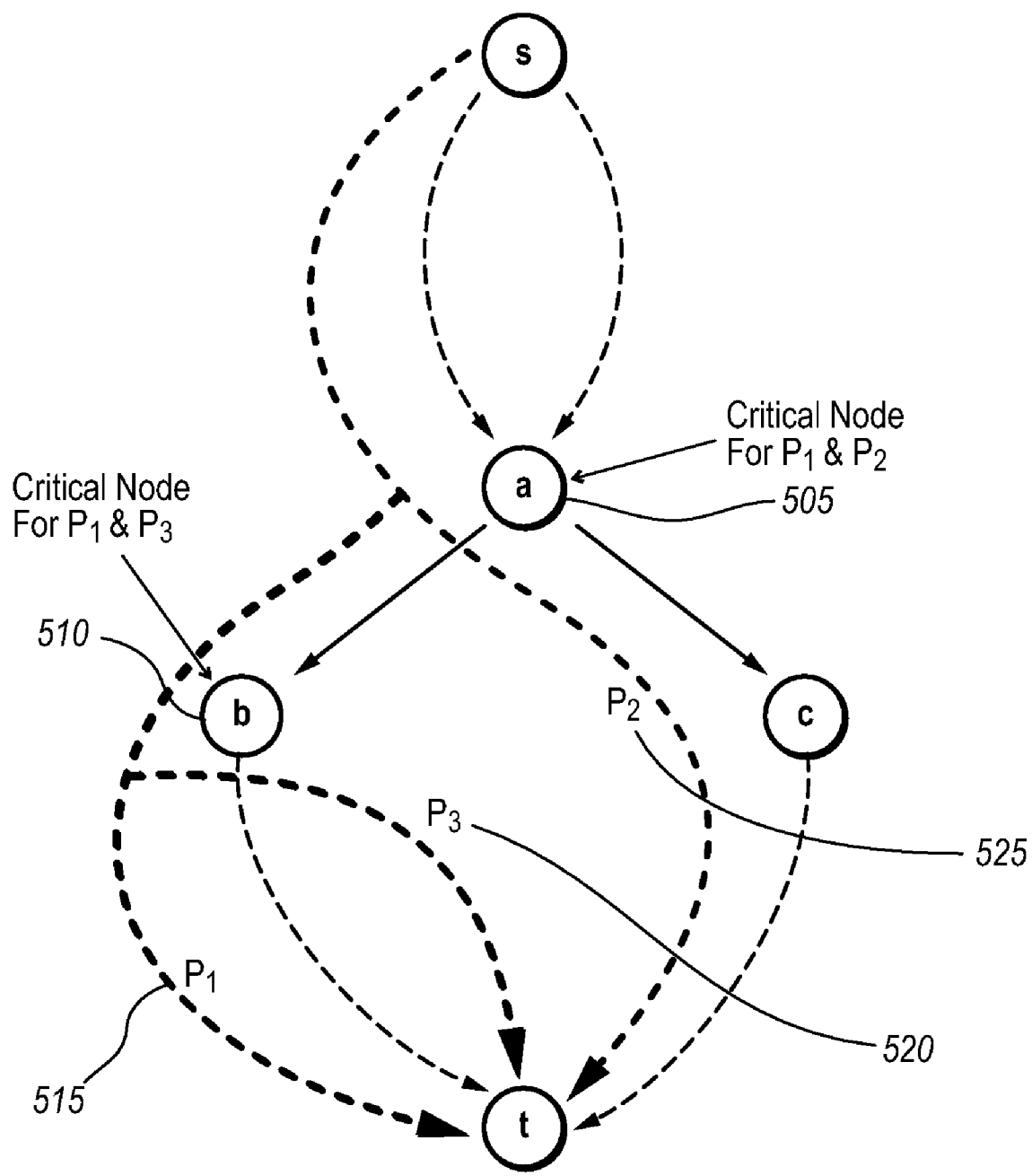
FIG. 5 illustrates an example control-flow graph showing critical nodes used in assigning path identifiers and edge weights in accordance with example embodiments described herein.

In order to describe the PPP function of this embodiment, it is useful to go through a control-flow path illustration. Accordingly, FIG. 5 illustrates a simple control-flow graph which includes three paths P1 515, P2 520, and P3 525. Paths P1 and P2 bifurcate at node a 505. Paths P1 and P3 bifurcate at node b 510. A "critical" node is defined as the node for a pair of paths within an identified subset of paths such that prior to the node, the pair of paths are common (i.e., they share the same edges up to that point). So, in FIG. 5, the critical node for paths P1 and P2 is node "a" 505. Similarly, the critical node for paths P1 and P3 is node "b" 510.

Partial identifiers are also tracked during the execution of the PPP edge weight assignment function. A partial identifier for a path "p" (i.e., pid(p)) is defined to be the sum of all the weights of all edges within the path "p", which have edge weights assigned to them. The PPP function typically processes each node in the CFG in reverse topological order; however, other ordering may be possible.

In an attempt to ensure that each path index identifier for paths within the subset of paths is unique therein, the PPP defines that for any critical node "v" for any pair of paths (e.g., p and p') in the subset of paths, the partial identifier should be different for p and p' after the node "v" has been processed. The PPP function also computes an edge assignment that attempts to achieve a compact path numbering that maintains the invariant, above, at every node. Having a compact path numbering assignment is advantageous in that the smallest possible array may be used to contain all the path index identifiers. In order to simplify the function, the PPP function works over intervals of path identifiers.

For example, given an edge "e" within a CFG, an interval (i.e., int(e,q)) represents the range of partial identifiers allocated to all the paths within the subset of paths that go through the edge "e" and have a prefix path "q". At every node "v", PPP computes an interval int(e,q) for every edge and prefix pair, (i.e., (e,q)), and assigns weights to the edges to maintain the invariant that none of the intervals, int(e,q) for all the edges "e" flowing out of the node "v" and all the prefixes of "e" will overlap after the node "v" is processed.

The above attempts to ensure compactness for the set of path index identifiers for the paths in the subset of paths. This compactness means that the PPP function will compute the minimal edge assignment such that intervals do not overlap. This, as noted before, is advantageous in allowing a minimally-sized array to be used during runtime path profiling. To achieve compaction, each edge weight, W(e) is computed by considering all the intervals induced on edges flowing out of node "v". The edge weight, W(e) is given by:

$$W(e_i) = cis_{i-1} - min_i \qquad \text{Eq. 1}$$

where $cis_{i-1}$ is the cumulative interval size of all intervals induced on previous edges and $min_i$ is the minimum partial path identifier. If multiple prefixes induce intervals on the outgoing edges of a node, then the PPP function will assign a weight equal to the maximum among all these weights. After this step, all paths within the subset of paths, but one, will be assigned a weight higher than what is required to separate its intervals. This procedure will, in instances, create holes (i.e., missing path index identifiers) in the resulting path numbering. This choice of weight, however, still leads to a compact numbering of paths (i.e., assignment of path index identifiers), which may or may not have holes.

The following Listing 1 illustrates an example of pseudo-code for implementing the PPP function, as described above for assigning edge weights for a program's CFG in accordance with example embodiments. It can be appreciated that Listing 1 is not a formal recitation in a formal computer programming language like C, but can still be appreciated and understood by one of skill in the art.

Listing 1. A preferential path profiling (PPP) function for computing edge weight assignments and path index identifiers for an identified subset of interesting paths.

Assume:
  i) all partial path identifiers, pid(p) are initialized to 0 for all paths in the subset of paths.
  ii) cis(q) is initialized to 0 for all prefixes q of paths in the subset of paths
for all nodes v in a control-flow graph for a program, in reverse topological order Listing 1. A preferential path profiling (PPP) function for computing edge weight assignments and path index identifiers for an identified subset of interesting paths.

```
do
    for all outgoing edges e from the node v such that the edge e is
    an edge within some path in the subset of paths
    do
        for all prefixes q in prefix(e) do
            // compute the beginning of the interval int_{e,q}
            min_{e,q} := minimum pid(p) over all paths in the subset of
            paths containing edge e and with prefix q);
            // compute the weight induced by q
            weight(q) := cis(q) - min_{e,q};
            // compute the maximum weight
            if ((W(e) = undefined) or(W(e) < weight(q))) then
                W(e) := weight(q);
            end if
        end for
        // update all the partial identifiers for all the
        // paths in the subset of paths containing edge e
        for all paths p in the subset of paths containing edge e do
            pid(p) := pid(p) + W(e);
        end for
        for all prefixes q in prefix(e) do
            // determine new cumulative interval size
            // for prefix q
            cis(q) := (maximum pid(p) over all paths in the subset of
            paths containing edge e) + 1;
        end for
    end for
end for
```

As shown, for each node "v" and for each outgoing edge flowing out of node "v", the function iterates over all prefixes and computes the beginning of the interval $int_{e,q}$ (i.e., $min_{e,q}$). It uses an auxiliary map, cis, to determine the cumulative interval size of intervals through previously processed outgoing edges of node "v" with the prefix "q" (as per Eq. 1) and computes the weight induced by "q" on the edge. Finally, the maximum of all the weights induced by each prefix is selected and this weight is assigned to the edge. After the edge is assigned a weight, the PPP function updates the partial identifiers of all the paths through the edge and also computes the new cis(q) for the next iteration on the edge.

For purposes of illustration only, but not by way of limitation, an example of the calculation of edge weights and path index identifiers using the function in Listing 1 is given. For the purposes of the example, the CFG illustrated in FIGS. 2A-2C is used (i.e., CFG 210). This example will calculate edge weights according to the PPP function and will result in the edge weights as shown in FIG. 2B. For purposes of the example, the identified subset of paths within the CFG 210 are is given as {sacdt, sact, and sbct}.

In the first step of the function, all the partial identifiers are initialized to 0 and the cumulative interval sizes (cis(q)) for all prefixes are initialized to 0. In the second step, Node "d" is identified as not a critical node for any pair of paths since it has only one outgoing edge. The prefix sacd induces an interval [0,0] on the edge (d,t). Since cis(sacd)=0, W((d,t))=0−0=0.

In the third step, node "c" is identified as a critical node for paths sacdt and sact. The edge (c,d) is then processed first. Both prefixes sac and sbc induce an interval [0,0] on this edge. So, the PPP function assigns a weight W((c,d))=0−0=0 to this edge. The PPP then updates the map cis as follows: cis(sac)=1 and cis(sbc)=1. Next, PPP processes the edge (c,t). The prefix sbc induces an interval [0,0] on this edge. Since cis(sbc)=1, PPP assigns a weight W((c,t))=1−0=1. The partial identifiers of paths sact and sbct, pid(sact) and pid(sbct), are both updated to 1.

In the fourth step, node "b" has one outgoing edge (b,c). The prefix sb induces an interval [1,1] on this edge. Then, PPP assigns a weight W((b,c))=0−1=−1 to this edge since cis(sb) =0. The partial identifier of path sbct, pid(sbct), is thus updated to 1+(−1)=0.

In the fifth step, node "a" has two outgoing edges, but only the edge (a,c) has paths within the subset of paths running through it. The prefix sa induces an interval [0,1] at this edge and the PPP assigns a weight W((a,c))=0−0=0 to this edge.

In step six, node "s" has two outgoing edges with three paths all sharing the common prefix "s". This prefix induces an interval [0,1] at the edge (s,a), and the interval [0,0] at the edge (s,b). The PPP processes the edge (s,a) first and assigns a weight W((s,a))=0−0=0 to the edge. Then PPP updates cis(s)=1+1=2, and processes the edge (s,b). Since cis(s)=2, the edge (s,b) is assigned a weight W((s,b))=2−0=2. The partial identifier of the path sbct is also updated to 2.

Upon termination, PPP assigns the identifiers (the path index identifiers) 0, 1, and 2 to the paths in the subset of paths, sacdt, sact, and sbct, respectively. Note that the identifiers assigned upon termination are the "partial" identifiers at the time of termination.

The above example, by following the PPP function described, above, produced the edge weight assignments which are illustrated in CFG 210 in FIG. 2B, and produced the path index identifiers as determined in the above discussion and illustrated in the array 200 as previously discussed and illustrated in FIG. 2D.

In summary, the PPP function attempts to achieve as nearly as compact as possible numbering of the paths in a subset of paths by i) only numbering the edges in a CFG required to distinguish paths within the subset of paths, and ii) computing relatively small weights for edges necessary such that the paths within the subset of paths are assigned unique identifiers.

It may also be noted that the path index identifiers which are determined by a numbering such as that determined by the PPP function, above, also produces an optimal numbering. It can be appreciated that the proof of optimality is beyond the scope of this paper; however, by analogy with arithmetic coding, as is well known, it has been shown that the PPP function is equivalent to an arithmetic coding scheme that uses a maximal context model within a graph. By such analogy, it is known that the numbering produced by the PPP function is optimal—i.e., produces a numbering for paths within a subset of paths which can be stored within a relatively small sized array (i.e., with the least number of "holes").

As has been noted before, even though the numbering of paths within the subset of paths is optimal, there may, indeed, be instances where there are "holes" in the numbering. In other words, when stored in a relatively small sized array, there will be elements in the array which do not contain path values. In other words, all elements within the array do not necessarily correlate to a path within the subset.

The PPP has several advantages over other techniques (e.g., Ball-Larus assignments) in that it biases edge weight assignments towards an identified subset of paths (e.g., "interesting" paths). The PPP function is advantageous because it will assign edge weights so that all paths within an identified subset of paths will have unique identifiers, but it allows paths not within the identified subset of paths to have identifiers which may be equal to an identifier for a path within the subset. This has the advantage that the identified subset of paths may be profiled using an array instead of a hash table, which is typically required for the arbitrarily large sets of paths identified by the Ball-Larus and similar functions. By using the PPP function and the corresponding array described herein, paths may be determined as belonging or as not belonging to the subset.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIGS. 3 and 4—is used to indicate the desired specific use of such terms.

Figure 3:
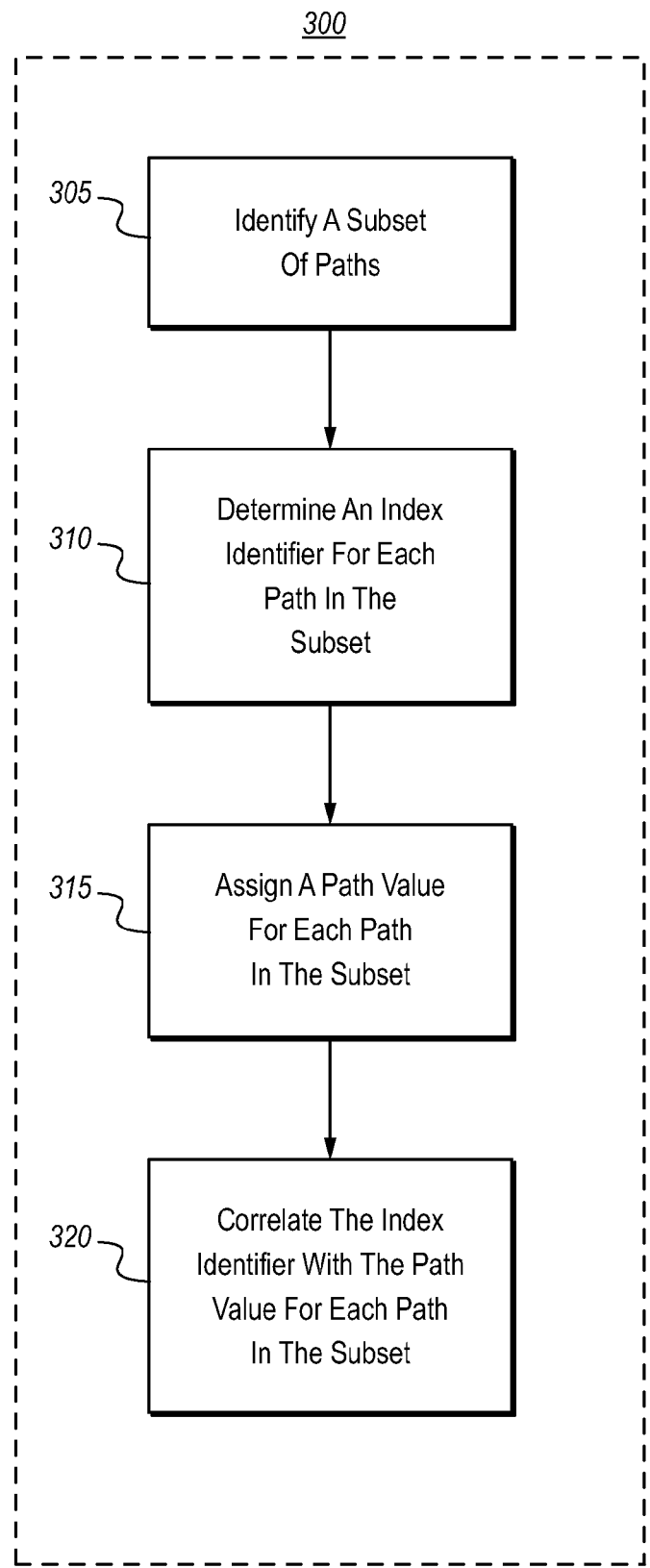
FIG. 3 illustrates a flow diagram of a method for creating a preferential path profiling array in accordance with example embodiments.
Figure 4:
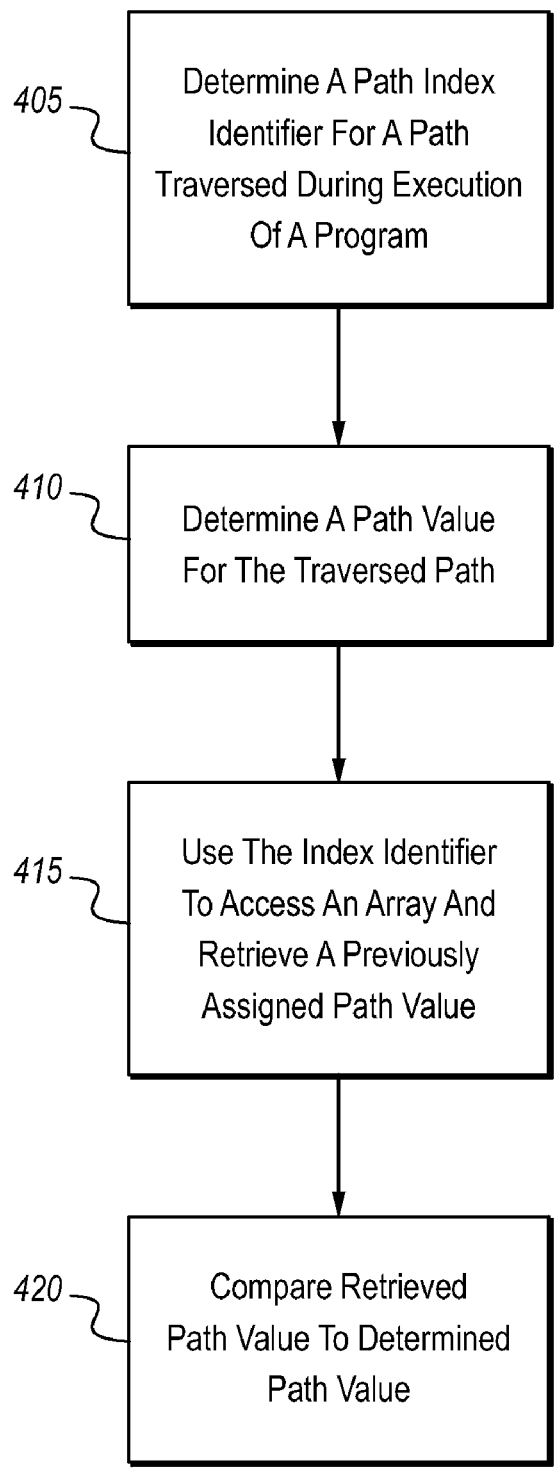
FIG. 4 illustrates a flow diagram of a method for using a preferential path profiling array in accordance with example embodiments.

As previously mentioned, FIGS. 3 and 4 illustrate flow diagrams for various exemplary embodiments of the present invention. The following description of FIGS. 3 and 4 will occasionally refer to corresponding elements from FIGS. 1, 2A-C, and 5. Although reference may be made to a specific element from these Figures, such references are used for illustrative purposes only and are not meant to limit or otherwise narrow the scope of the described embodiments unless explicitly claimed.

FIG. 3 illustrates a flow-diagram for a method 300 of reducing the overhead associated with path profiling by constructing an array of values that represent a subset of an overall number of paths within a CFG. Method 300 includes a step for generating 325 a path profile array. More specifically, step for 325 includes an act of identifying 305 a subset of paths. For example, a subset of paths from a number of control-flow paths may be identified, which represent an abstraction of a program's dynamic control-flow behavior. Note that the subset of paths may be chosen based on some predefined criteria to limit path selection. Such predefined criteria may have been predefined based on any number of reasons as previously described.

Step for 325 also includes an act of determining 310 an index identifier for each path in the subset. For example, a different path index identifier 125 can be determined for each of the subset of paths. Further, step for 325 also includes an act of assigning 315 a path value for each path in the subset. For instance, a path value 130 may be assigned for each of the subset of paths. Note each of the path values will be used in distinguishing the subset of paths from some of the paths not in the subset.

For each path within the subset of paths, step for 325 includes an act of correlating the index identifier with the path value for each path in the subset. For example, for each path within the subset of paths, the determined index identifier (e.g., index identifier 125 corresponding to the array 100 index) is correlated with the assigned path value (e.g., path value$_{1-N}$ 130) such that during a runtime path profiling implementation for the program, the appropriate index identifier 125 and correlated path value 130 can be used to determine if a particular path traversed corresponds to a path within the subset of paths. It can be appreciated that such a method 300 would construct an array 100 as described, above, which may then be used during path profiling for identifying paths within a subset of paths. It may also be appreciated that if the array were constructed or allocated with space for an "other value" 135 then path profiling information may also be stored within the array during runtime path profiling.

FIG. 4 illustrates a flow diagram for a method 400 of using an array as constructed by a method 300 similar to that described above. Method 400 includes an act of determining 405 a path index identifier for a path traversed during execution of a program. For example, using the weights assigned by the PPP function, a path index identifier 125 can be determined for a path traversed during execution of a computer program. The path index identifier 125 represents a subset of paths from a number of control-flow paths that represent an abstraction of the program's dynamic control-flow behavior. Note that as above, the subset of paths may be chosen based on predefined criteria to limit path selection.

Method 400 also includes an act of determining 410 a path value for the traversed path. For example, using a function that assigns unique values to paths (e.g., the Ball-Larus values), a first path value can be determined for the traversed path. Note that the first path value represents an identifier used in distinguishing the subset of paths from some of the paths not in the subset. Based on the determined path index identifier, method 400 then includes an act of accessing the array to retrieve a previously assigned path value therein. More specifically, the path value 130 that was assigned to the index identifier 125 during the creation of the array 100 is retrieved. Method 400 then includes an act of comparing the retrieved path value to the determined first path value. For instance, the retrieved path value 130 (which is part of the subset) is compared to the determined first path value (which may or may not be associated with the subset) to determine if the path is within the subset of paths.

As can be appreciated, the creation and use of arrays 100 as described above, overcome some of the problems, expense, and inefficiencies associated with path profiling. More specifically, as previously noted, by identifying a subset of paths from the number of paths within a control-flow graph of a computer program, an array 100 may be used to identify the paths within a subset of paths and may also be used to store path profiling information during a runtime of a particular program. By the construction and use of arrays as described, above, the problems associated with arbitrarily large numbers of paths within a program's control-flow graph and with the expense of hash function computation and hash table lookup may be overcome.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer profiling environment that typically records a computer program's control transfers through a sequence of executed instructions, each sequence representing a path that defines a characterization of a program's dynamic behavior, a method of reducing the overhead associated with path profiling by constructing an array of values that represent a subset of an overall number of paths within a control-flow graph for the program, the method comprising:

identifying a subset of paths from a number of control-flow paths, which represent an abstraction of a program's dynamic control-flow behavior, and wherein the subset of paths are chosen based on predefined criteria to limit path selection;

determining a different path index identifier for each of the subset of paths, each index identifier to be associated with an index into an array representing the entire subset of paths;

wherein determining a different path index identifier for each of the subset of paths further comprises:
assigning edge weights to one or more edges within the control-flow graph of the program;
traversing each edge which lies within a particular path, the path comprising one or more edges within the control-flow graph; and
summing the edge weights having been assigned to the edges within the control-flow graph for the program which are traversed by the path to determine the different path index;

assigning a path value for each of the subset of paths, each of the path values used in distinguishing the subset of paths from at least some of the paths not in the subset;
wherein assigning a path value further comprises:
assigning second edge weights to one or more edges within the control-flow graph of the program;
traversing each edge which lies within a particular path, the path comprising one or more edges within the control-flow graph; and
summing the second edge weights having been assigned to the edges within the control-flow graph for the program which are traversed by the path to create a path value; and for each path within the subset of paths, correlating within the array the determined index identifier and the assigned path value, using the index identifier as the array index into the elements of the array and storing the path value within a corresponding element of the array, such that during a runtime path profiling implementation for the program, the appropriate index identifier and correlated path value can be used to compare a traversed path with a assigned path value in order to determine if the path is within the subset of paths.

2. The method of claim 1, wherein the array further comprises a field or multiple fields for storing values representing additional path profiling information.

3. The method of claim 1, wherein a path index identifier determined for a path within the subset of paths is equivalent to a path identifier determined for a path which is in the control-flow graph of the program but which is not within the subset of paths, and wherein the path value assigned for the path within the subset is different from a path value assigned for the path which has the equivalent path identifier but which is not within the subset.

4. The method of claim 1, wherein the index identifiers assigned to each of the subset of paths represents an optimal numbering of all the paths within the subset of paths.

5. The method of claim 1, wherein the array comprises at least one element not associated with a path index identifier for a path within the subset.

6. The method of claim 1, wherein assigning a path value for each of the subset of paths comprises computing the Ball-Larus identifier for the path.

7. In a runtime computer profiling environment that typically records a computer program's control transfers through a sequence of executed instructions, each sequence representing a path that defines a characterization of a program's dynamic behavior, a method of reducing the overhead associated with typical path profiling by identifying paths of interest using a predetermined array that defines a subset of an overall number of paths within a control-flow graph for the program, the method comprising:

determining a path index identifier for a path traversed during execution of a computer program, the path index identifier being part of an array representing a subset of paths from a number of control-flow paths that represent an abstraction of the program's dynamic control-flow behavior, and wherein the subset of paths are chosen based on predefined criteria to limit path selection;

wherein determining a path index for a path further comprises:

assigning first edge weights to one or more edges within the control-flow graph of the program;

traversing each edge which lies within the path, the path comprising one or more edges within the control-flow graph; and summing the first edge weights having been assigned to the edges within the control-flow graph for the program which are traversed by the path to determine the path index;

determining a first path value for the traversed path, the path value representing an identifier used in distinguishing the subset of paths from at least some of the paths not in the subset;

wherein determining the first path value for a traversed patch comprises:

assigning second edge weights to one or more edges within the control-flow graph of the program;

traversing each edge which lies within the path, the path comprising one or more edges within the control-flow graph; and summing the second edge weights having been assigned to the edges within the control-flow graph for the program which are traversed by the path to determine the first path value;

based on the determined path index identifier, accessing the array using the index identifier as an index into the array elements to retrieve a previously assigned path value therein; and comparing the retrieved assigned path value with the determined first path value in order to determine if the path is within the subset of paths.

8. The method of claim 7, wherein determining the first path value comprises determining the Ball-Larus identifier for the path.

9. The method of claim 7, wherein the index identifiers determined by summing edge weights for each path within the subset of paths represents an optimal numbering of the subset of paths.

10. The method of claim 7, further comprising when a path is determined to be within the subset of paths, storing a value or set of values representing path profiling information into the array.

11. The method of claim 7, wherein the first path value determined for the path traversed is not equal to the retrieved assigned path value such that the path is determined to be not a path within the subset of paths.

12. A computer program product comprising a computer-readable storage medium having encoded thereon computer executable code which, when executed within a suitable computing environment, performs the method comprising:

determining a path index identifier for a path traversed during execution of a computer program, the path index identifier being part of an array representing a subset of paths from a number of control-flow paths that represent an abstraction of the program's dynamic control-flow behavior, and wherein the subset of paths are chosen based on predefined criteria to limit path selection;

wherein determining a path index for a path further comprises:

assigning first edge weights to one or more edges within the control-flow graph of the program;

traversing each edge which lies within the path, the path comprising one or more edges within the control-flow graph; and summing the first edge weights having been assigned to the edges within the control-flow graph for the program which are traversed by the path to determine the path index;

determining a first path value for the traversed path, the path value representing an identifier used in distinguishing the subset of paths from at least some of the paths not in the subset;

wherein determining the first path value for a traversed patch comprises:

assigning second edge weights to one or more edges within the control-flow graph of the program;

traversing each edge which lies within the path, the path comprising one or more edges within the control-flow graph; and summing the second edge weights having been assigned to the edges within the control-flow graph for the program which are traversed by the path to determine the first path value;

based on the determined path index identifier, accessing the array using the index identifier as an index into the array elements to retrieve a previously assigned path value therein; and comparing the retrieved assigned path value with the determined first path value in order to determine if the path is within the subset of paths.

13. The computer program product as recited in claim 12 wherein determining the first path value comprises determining the Ball-Larus identifier for the path.

14. The computer program product as recited in claim 12 wherein the method further comprises when a path is determined to be within the subset of paths, storing a value or set of values representing path profiling information into the array.

* * * * *